Figure 1:
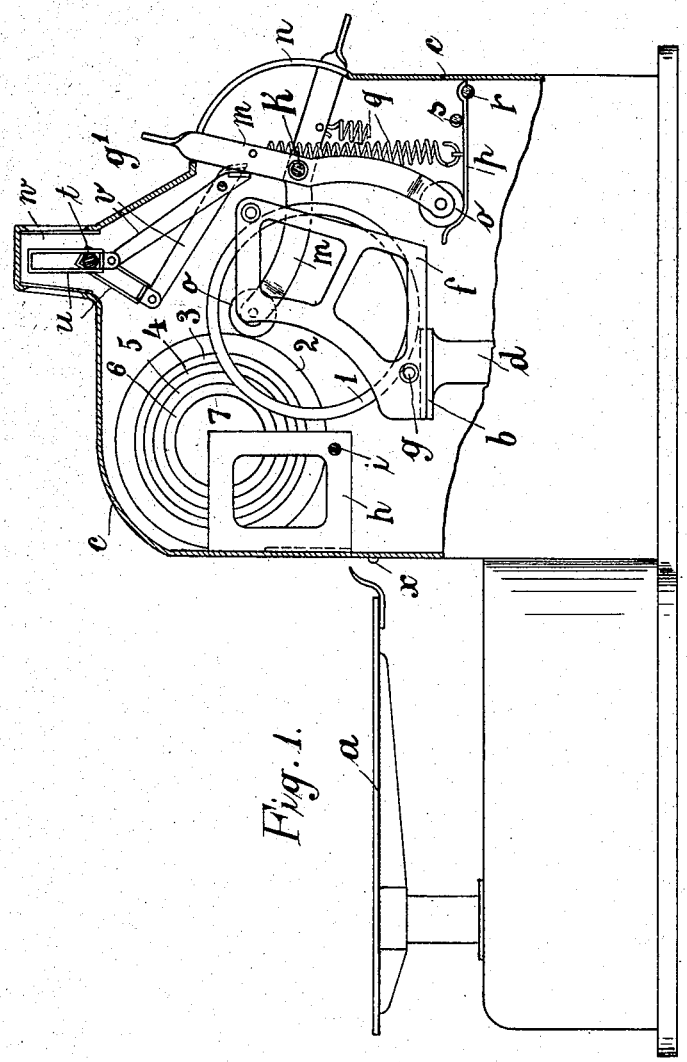

J. LEUENBERGER & H. SENN.
BALANCE.
APPLICATION FILED FEB. 2, 1914.

1,145,427.

Patented July 6, 1915.
3 SHEETS—SHEET 3.

UNITED STATES PATENT OFFICE.

JOHANN LEUENBERGER AND HEINRICH SENN, OF BERNE, SWITZERLAND.

BALANCE.

1,145,427.

Specification of Letters Patent.

Patented July 6, 1915.

Application filed February 2, 1914. Serial No. 815,941.

*To all whom it may concern:*

Be it known that we, JOHANN LEUENBERGER and HEINRICH SENN, citizens of the Swiss Confederation, and residing at Berne, Switzerland, have invented certain new and useful Improvements in Balances, of which the following is a specification.

Balances in which the scale for the weights and the weights themselves are accommodated in a closed casing which can be sealed for the purpose of preventing deceitful manipulations are well known. Likewise, balances are well known in which round disk-shaped weights are conveyed both to the scale by means of levers from a frame which is arranged laterally of the scale for the weights and is provided like the scale with guides for the individual weights, and, reversely, from the scale into the frame. Of these known balances the former possess no disk-shaped round weights and are therefore troublesome to operate, whereas the latter have the serious drawback that each weight can be removed individually from the frame on to the scale but not reversely individually from the scale to the frame. Consequently, in these balances, even when a closed casing which can be sealed is provided there is no certainty of honest weighing and, in addition, the work with them is unreliable and troublesome because the frames obstruct the scale and, when the scale is too severely loaded, the weighing must be begun again and, when loaded on one side, the scale can tilt toward the loaded side so that the weights fall out.

A primary object of our invention is to provide an improved balance of the type last referred to above comprising a device for placing rolling weights in position, to which the defects mentioned are not attached. To this end, each of the disk-shaped round weights is associated with a lever in such manner that in its one end position it holds its weight in the frame or rack and, when moved into its other end position, releases its weight so that the same automatically arrives in the corresponding guide of the scale and, when returning into the first position, returns the weight individually and independently of the other weights into the rack. In order to obtain as convenient operation of the balance as possible and in order that the balance may always work reliably the rack is arranged relatively to the scale for the weights in such manner that in the lowest position of this scale the weights can roll into their seats. In consequence of this construction of the balance all weighing operations can be rapidly performed and dishonest manipulations are impossible; the oscillations of the scale for the weights cannot be obstructed at least within the limits requisite for exact readings and, lastly, it is impossible for the weights to fall out of their scale.

To these ends our invention consists in the construction, arrangement and combination of parts described hereinafter and pointed out in the claims.

One illustrative embodiment of the invention is represented by way of example in the accompanying drawings, wherein:—

Figure 2:
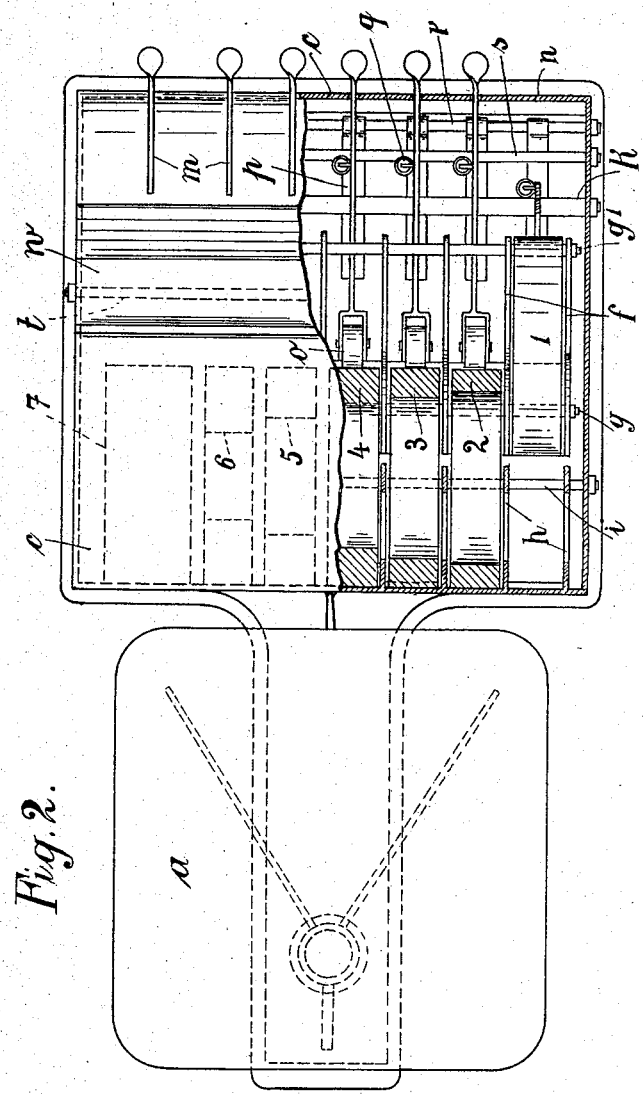
Figure 3:
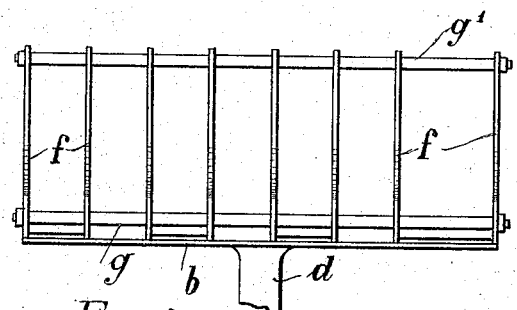
Figure 4:
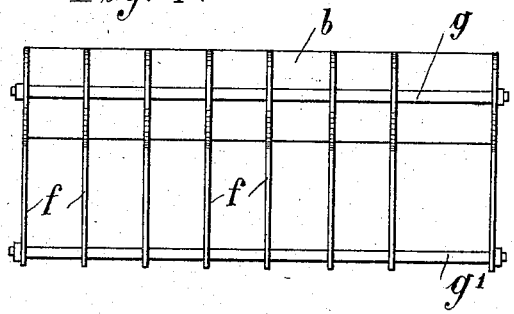
Figure 5:
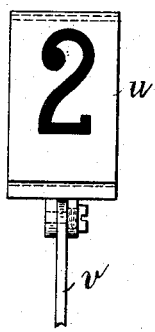
Figure 6:
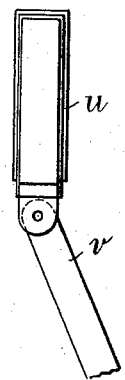

Figure 1 shows a preferred form of balance in side elevation, and Fig. 2 is a top plan view thereof, part of the cover being shown broken away; Figs. 3 and 4 are front elevation and top plan view, respectively, of the scale for the weights, and Figs. 5 and 6 are front and side elevation, respectively, of parts of the indicating device.

Referring to the drawing, a balance of a kind known in itself having equal arms is shown, and of the known parts of the balance only those requisite for understanding the invention are shown.

The scale for receiving the goods to be weighed is designated $a$ and that for carrying the weights $b$. The latter is located in a closed and sealed casing $c$. The scale $b$ (Figs. 1, 3 and 4) consists of a transverse horizontal strip, attached to the balance beam $d$, and supporting several spaced vertical walls $f$. These walls are connected rigidly with one another by the transverse rods $g$, $g^1$ arranged in different vertical planes one above the other. The weights are rings 1—7 all of which have the same outside diameter, but various inside diameters. If preferred, solid disks may be used. These rings or disks correspond to the various customary legal units of weight. In their normal position each of the weights rests in a rack comprising a horizontal rod $i$ and the walls $h$ mounted on the wall of the casing. This rod $i$ is located higher than the rod $g$ of the scale $b$ and is at such a distance from the wall of the casing that the center of gravity of the weights resting on it is located between the rods $g$ and $i$, so that the weights tend to fall from the rod $i$ on to the scale $b$.

The distance between the two rods $g$ and $g^1$ is less than the outside diameter of the weights, and therefore when the latter roll down on to the scale $b$ they cannot pass between the rods $g$ and $g^1$, and consequently rest freely on the scale $b$ without contacting with other parts of the balance. In order to convey the weights from the said rack to the scale $b$, and vice versa, and each individually and independently of the others, we provide in the casing $c$ the following mechanism. A two-armed lever $m$ is fulcrumed in the plane of movement of each weight on a horizontal axle $k$ arranged in front of the scale $b$; the one arm of each lever projects through a vertical slot $n$ in the front part of the casing $c$, and is preferably provided with a number corresponding to the weight associated with it. On the other arm of each lever $m$ is journaled an anti-friction roller $o$ which can contact with the weight corresponding to the lever. A spring $q$ attached to the former arm and to a resilient stop or leaf spring $p$ tends to draw the upper arm downward into a position determined by the lower end of the slot $n$. The weights in the rack normally hold the levers $m$ in this position (Figs. 1 and 2). The other end position of the levers $m$ is determined by the upper end of the slot $n$. In order to prevent the springs $q$ rocking the levers $m$ out of this position into the other, each stop $p$ is elastic or can rock about a horizontal axle $r$ and is bent at its free end into the shape clearly shown in Fig. 1, so that it will partially embrace the roller $o$. A horizontal rod $s$ is arranged over all the stops $p$ and determines their upper position.

An indicating device is provided in the upper part of the casing and enables both the buyer and the seller to see what weights are placed on the scale $b$. This indicating device comprises for each weight the well-known indicator which, however, in the embodiment shown here is a U-shaped member pushed over a horizontal rod $t$ and pivotally connected below to the end of the long arm of a two-armed lever $v$. The free end of the short arm of this lever is beveled and is located in the range of the lever $m$ associated with it in such manner that when the weight corresponding to the latter is released, the lever $m$ rocks the long arm of the lever $v$ upward. Consequently, the indicator $u$ is moved into a top portion $w$ of the casing in which it is visible both from the front and the rear through windows. In order that it may be known when the balance is in a state of equilibrium the scale for the goods is provided with a pointer and the rear wall of the casing with a projection $x$.

We claim:—

1. The combination with the weight scale of a balance of rolling weights located above said scale, a rack for said rolling weights, a plurality of levers each adapted in one position to hold a rolling weight in said rack and in another position to release said weight allowing it to roll onto said scale, the said levers when moving from the latter position into the former returning their weights from the said scale to the said rack.

2. The combination with the weight scale of a balance of rolling weights located above said scale, a rack for said weights, a plurality of levers each adapted in one position to hold a rolling weight in said rack and in another position to release said weight, allowing it to roll on to said scale, the said levers when moving from the latter position into the former returning their weights from the scale to the rack, and a spring for each lever adapted to retain it in the former position.

3. The combination with the weight scale of a balance of rolling weights located above said scale, a rack for said weights, a plurality of levers each adapted in one position to hold a rolling weight in said rack and in another position to release the said weight allowing it to roll on to said scale, the said levers, when moving from the latter position into the former returning their weights from the scale to the rack, and a stop for each lever, holding it in the latter position.

4. The combination with the weight scale of a balance of rolling weights located above said scale, a rack for said weights, a plurality of levers each adapted in one position to hold a rolling weight in said rack and in another position to release said weight allowing it to roll on to said scale, the said levers when moving from the latter position into the former returning their weights from the scale to the rack, a spring for each lever adapted to hold it in the former position, and a resilient stop for each lever holding it in the latter position.

5. The combination with the weight scale of a balance of rolling weights located above said scale, a rack for said weights, a plurality of levers each adapted in one position to hold a rolling weight in the rack and in another position to release said weight allowing it to roll on to said scale, the said levers when moving from the latter position into the former returning their weights from the scale to the rack, a spring for each lever adapted to hold it in the former position, and a resilient stop for each lever influenced by said spring and adapted to hold it in the latter position against the action of the corresponding spring.

6. The combination with the weight scale of a balance of rolling weights located above said scale, a rack for said weights, a plurality of levers each adapted in one position to hold a rolling weight in the rack and in another position to release said weight allowing it to roll on to said scale, the said levers when moving from the latter position into the former returning their weights from the scale to the rack, and indicating mechanism comprising a plurality of two armed levers each having one arm adapted to be actuated by one of the said weight controlling levers, and a plurality of indicators each carried by the other arm of said two-armed levers.

In testimony whereof, we affix our signatures in the presence of two witnesses.

JOHANN LEUENBERGER.
HEINRICH SENN.

Witnesses:
HANS RINDERKNECHT,
FRIEDRICH MONING.

Copies of this patent may be obtained for five cents each, by addressing the "Commissioner of Patents, Washington, D. C."